United States Patent [19]
Walker, Jr.

[11] 3,878,910
[45] Apr. 22, 1975

[54] ELECTRIC DRIVE UNIT FOR BICYCLES

[76] Inventor: Thomas J. Walker, Jr., 3939 Turquoise Cir., Eagan, Minn. 55122

[22] Filed: Dec. 5, 1973

[21] Appl. No.: 421,848

[52] U.S. Cl. ............... 180/34; 180/74; 180/33 D
[51] Int. Cl. .......................................... B62m 7/08
[58] Field of Search............ 180/34, 31, 33 C, 33 D, 180/65 A, 65 R, 74

[56] References Cited
UNITED STATES PATENTS

| | | | |
|---|---|---|---|
| 1,288,068 | 12/1918 | Long | 180/31 |
| 2,779,426 | 1/1957 | Harris et al. | 180/74 |
| 3,056,460 | 10/1962 | Hanson | 180/31 |
| 3,431,994 | 3/1969 | Wood, Jr. | 180/31 |

FOREIGN PATENTS OR APPLICATIONS

| | | | |
|---|---|---|---|
| 379,324 | 3/1940 | Italy | 180/34 |
| 554,422 | 2/1957 | Belgium | 180/74 |
| 47,355 | 3/1937 | France | 180/33 D |
| 85,334 | 1/1936 | Sweden | 180/33 D |

*Primary Examiner*—Kenneth H. Betts
*Assistant Examiner*—Jack D. Rubenstein
*Attorney, Agent, or Firm*—Stuart R. Peterson

[57] ABSTRACT

The electric drive unit includes a frame that has its lower end mounted on the rear axle of the bicycle. The frame is held in a vertical, wheel-straddling relationship by a pair of arms that are attached to the bicycle's rear fork. The upper end of the frame provides a horizontal pivot axis for an electric motor, the motor being laterally offset so that its drive wheel overlies and frictionally engages the rear tire of the bicycle. The drive wheel's axis of rotation is forwardly disposed with respect as to the pivot axis, the distance between these two axes being greater than the radius of the drive wheel, but less than the distance the pivot axis is above the tire.

8 Claims, 7 Drawing Figures

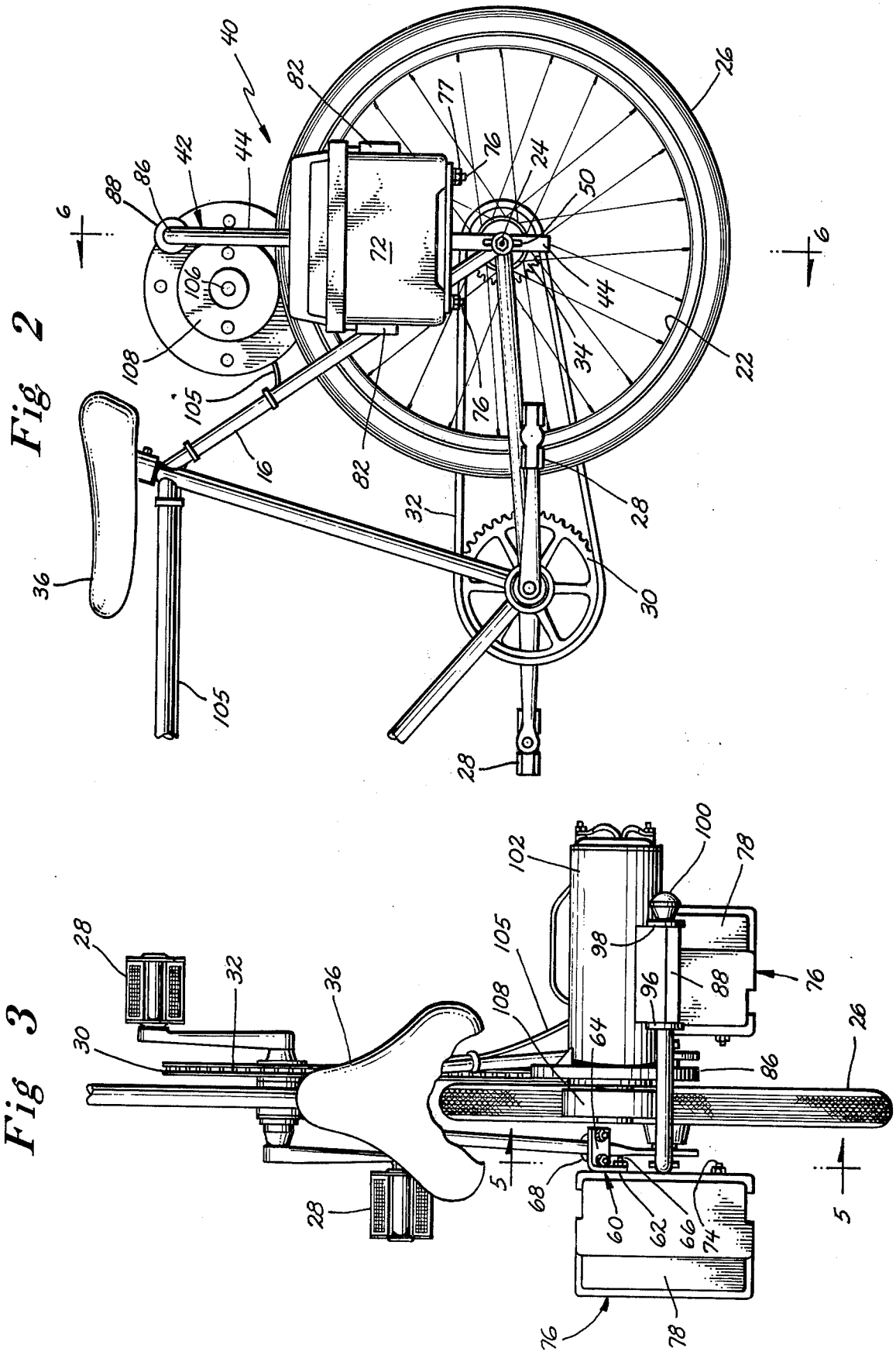

ELECTRIC DRIVE UNIT FOR BICYCLES

BACKGROUND OF THE INVENTION

1. FIELD OF THE INVENTION

This invention relates generally to battery-powered bicycles, and pertains more particularly to an assembly or unit that can be attached to a conventional bicycle for frictionally driving its rear wheel.

2. DESCRIPTION OF THE PRIOR ART

Various attempts have been made in the past to produce a satisfactory electrically driven bicycle. Those arrangements with which I am acquainted either require that the driving apparatus be installed on the bicycle at the factory or that the bicycle subsequently be rather extensively modified. In either case, the cost has been virtually prohibitive and this has militated against any widespread use of batteries for supplying electric power in the propelling of bicycles. A number of the prior art arrangements have also been quite complicated, cumbersome and unduly heavy, thereby additionally discouraging use of such equipment on bicycles.

SUMMARY OF THE INVENTION

Accordingly, one object of the present invention is to provide an electric drive assembly for bicycles constituting a simple unitary structure that can be readily mounted on most conventional bicycles.

Another object is to provide an assembly or unit that will carry the batteries in such a way that they will not adversely affect the bicycle's balance. More specifically, it is planned that one battery be carried at one side of the bicycle and the other at the other side, their elevation being such that a relatively low center of gravity is provided so as not to adversely influence the bicycle's handling or operation.

Another object of the invention is to provide an assembly or unit of the foregoing character that is fully automatic, self-energizing, and in which the driving friction varies proportionally to the power requirements. Stated somewhat differently, the drive wheel on the electric motor is disposed at a location such that when more power is to be supplied to the driven rear wheel of the bicycle the friction between the drive wheel and the rear tire, which is engaged by the drive wheel, is automatically increased so as to minimize the likelihood of slippage.

Another object of the invention is to provide an assembly or unit as referred to above that is highly efficient in its operation, there being no gear reducers or chains required.

Still another object of the invention is to provide an assembly or unit that will enable the bicycle to be pedalled in a normal fashion, pedalled with the assistance of the attached assembly, or propelled entirely by the assembly, all as variable riding circumstances dictate.

Still further, an object of the invention is to provide an assembly that is relatively light in weight, particularly as contrasted with prior art designs.

Yet another object is to provide a unit that will advantageously permit regenerative braking to be realized when the bicycle's speed exceeds its normal operating speed, such as when coasting down a hill.

Briefly, my invention comprises a unit having a frame that is mounted substantially vertically at the rear of the bicycle; more specifically, the lower end of the frame is fastened to the rear wheel axle. Arms or struts maintain the substantially vertical relationship by reason of being connected to the rear fork of the bicycle. The upper end of the frame is provided with a horizontal shaft that extends to one side of the frame so as to receive thereon an encircling sleeve to which the electric motor is attached. In this way, the electric motor is laterally offset so that its drive wheel will overlie and frictionally engage the rear tire of the bicycle. The axis of rotation of the drive wheel is forwardly of a vertical line through the rear wheel axle, and the axis of rotation of the drive wheel is spaced from the axis about which the motor pivots a distance greater than the radius of the drive wheel, yet less than the distance the pivotal axis is spaced above the periphery of the tire. Such an arrangement results in the forming of a "notch" that causes the drive wheel to "dig" against the tire, the pressural digging action increasing in accordance with the power requirements of the vehicle. L-shaped plates are attached to each side of the frame and have affixed thereto two casings or housings which carry the batteries that supply the electric power for the motor. A switch is located forwardly, such as on the handlebars, so that the electric motor can be connected and disconnected, the batteries energizing the motor when the switch is closed and deenergizing the motor when the switch is open.

BRIEF DESCRIPTION OF THE DRAWINGS

FIG. 2 is a fragmentary elevational view of the rear portion of the bicycle of FIG. 1, the view being on a larger scale in order to show to better advantage the general construction of my drive unit;

FIG. 3 is a top plan view corresponding to FIG. 2;

DESCRIPTION OF THE PREFERRED EMBODIMENT

Figure 1:
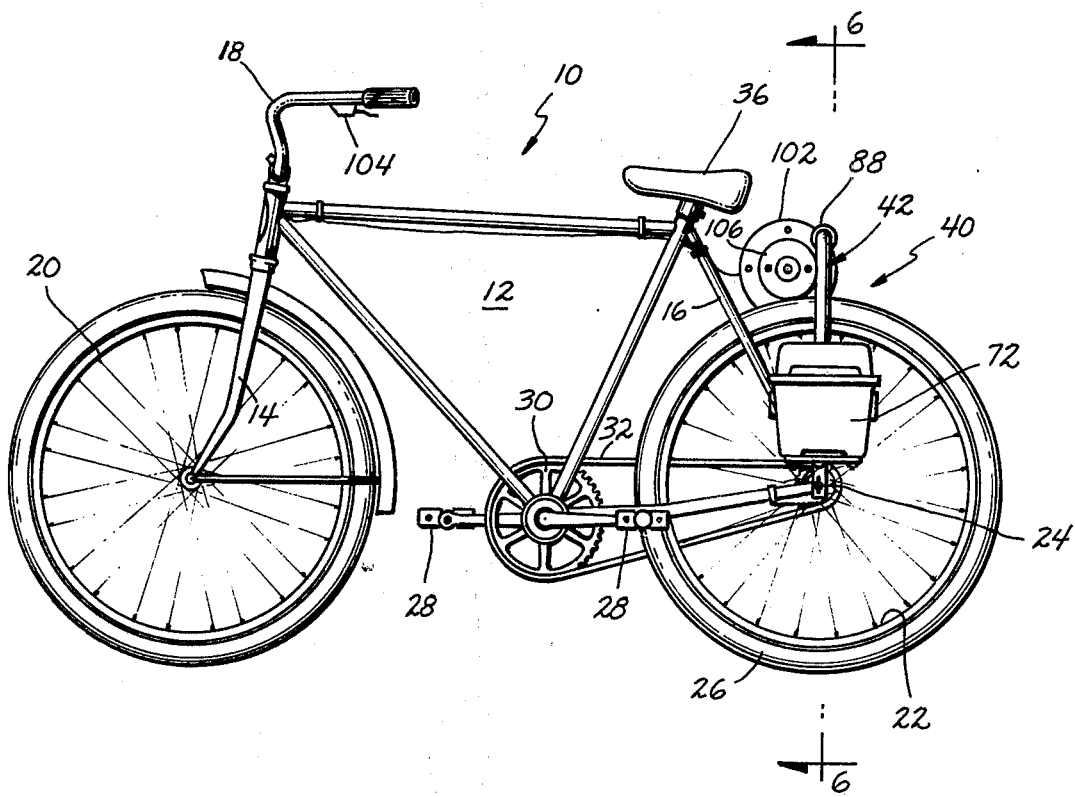
FIG. 1 is a side elevational view of a bicycle having my electric drive unit or assembly installed thereon.
Figure 5:
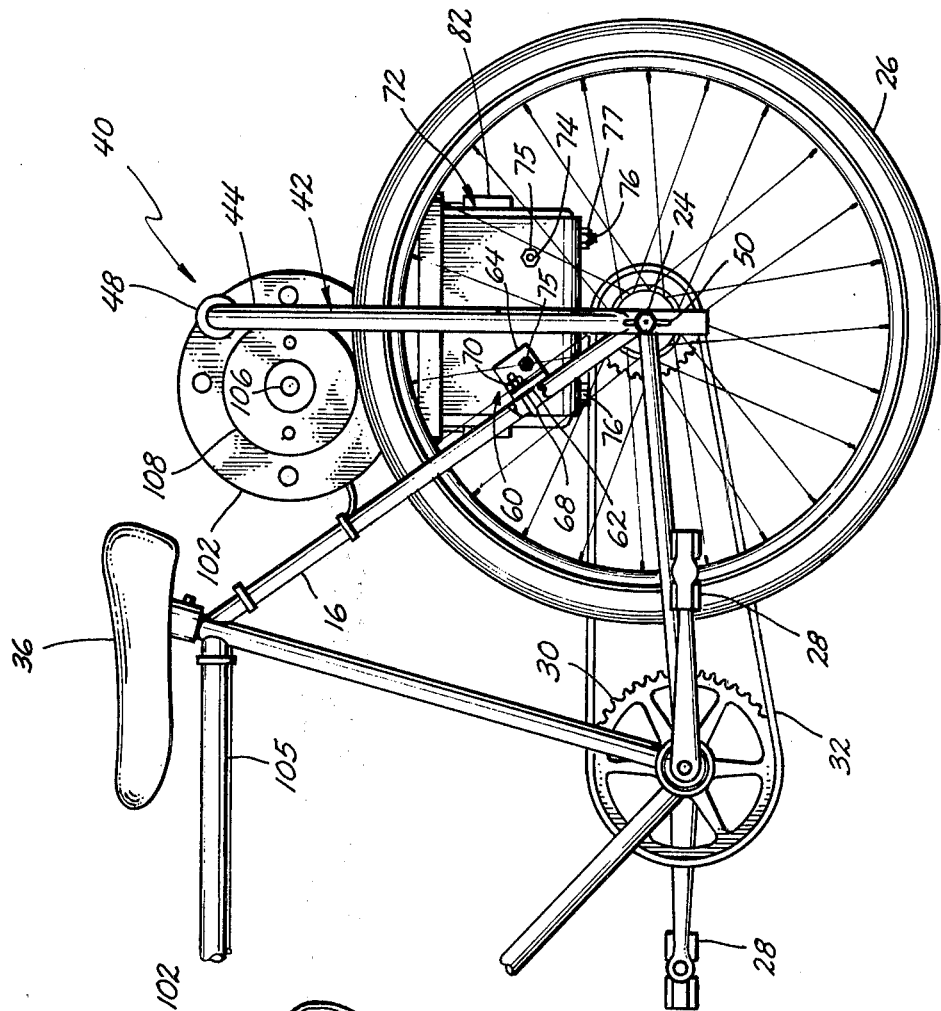
FIG. 5 is a view taken in the direction of line 5—5 of FIGS. 3 and 4, the view showing to better advantage the manner in which my frame is mounted on the bicycle.

Referring first to FIG. 1, a conventional bicycle denoted generally by the reference numeral 10 has been pictured. In this regard, the bicycle 10 comprises a frame 12 having front and rear forks 14, 16, respectively. Handlebars 18 are provided at the upper end of the front fork 14 and a front wheel 20 is journaled for rotation at the lower end of the front fork. Somewhat similarly, a rear wheel 22 has an axle 24 supported by the rear fork 16, the rear wheel being rotatable on the axle 24. The rear wheel 22 is equipped with the usual rubber tire 26 via which the bicycle 10 can be electrically driven, as will hereinafter become manifest. The usual pedals 28, drive sprocket 30, endless chain 32 and driven sprocket 34 are also shown. As already indicated, the bicycle 10 is of conventional construction and the rider simply sits on the seat 36 and pedals in the usual manner. Actually, the entire description up to this point has been concerned with a conventional bicycle.

My electric drive unit or assembly has been denoted in its entirety by the reference numeral 40. The unit 40 comprises a frame 42 composed of two vertical members 44, 46 and a horizontal connecting member 48 bridging the upper ends thereof. The lower ends of the elongated frame members 44, 46 are formed with mounting holes 50. It will be appreciated that the lower ends of the members are fastened to the ends of the rear axle 24, which ends project outwardly through the appropriate holes 50, the usual axle nuts 52, when tight, retaining the frame members 44, 46 at the proper height by reason of the selection of the appropriate holes 50.

At this time, attention is directed to a pair of L-shaped plates 54, there being one at each side of the frame 42. More specifically, each L-shaped plate 54 includes a vertical panel 56 and a horizontal panel 58. The vertical panels 56 are welded to the elongated, vertical frame members 44, 46.

Having mentioned the L-shaped plates 54, it can now be explained that the vertical panels 56 provide the means for maintaining the elongated members 44, 46 substantially vertical. In this regard, it will be noted that angled arms or links 60 are employed, each arm 60 including a pair of flanges 62, 64. The flanges 62 are provided with slots so that they can be anchored to the vertical panels 56 by means of bolts 66 which will be referred to in greater detail hereinafter. The other flange 64 of each arm 60 is apertured for the accommodation of the two legs of a U-shaped bolt 68. One U-shaped bolt 68 encircles one of the fork members 16 and the other U-shaped bolt 68 similarly embraces the other fork member at the other side, being fixedly held in place by nuts 70 threadedly attached to these U-shaped bolts 68. It will thus be appreciated that the links or arms 60 function as struts which, owing to their connection to the rear fork 16 and to the vertical panels 56 of the L-shaped plates 54 maintain the frame 42 vertical.

In addition to functioning as an intermediary for maintaining the frame 42 erect or vertical, the L-shaped plates 54 support two battery casings 72, there being one such casing 72 resting on one of the horizontal panels 58 and a second resting on the other horizontal panel 58. Reference has already been made to the bolt 66 extending through the vertical flange 62 of the link or arm 60 at each side. Each bolt 66 also passes through the wall of one casing 72, thereby assisting in the holding of the casing 72 in place. An additional or second bolt 74 also extends through the wall of each casing 72, passing through another aperture provided in the vertical panel 56 of each L-shaped plate 54. As with the first bolt 66, a suitable nut 75 holds the casing against the vertical panel.

Somewhat similarly, there are two downwardly projecting bolts 76 that pass through apertures in the horizontal panel 58 of each L-shaped plate 54. Here again, nuts 77 are employed for anchoring the bolts in position against the horizontal panel.

Consequently, each battery casing 72 is fixedly retained on the L-shaped plate 54 with which it is supported. However, the nuts 75, 77 can be removed in order to permit detachment of either or both of the casings 72 if the occasion arises to do so.

Each casing 72 is provided with a removable lid 76 having a horizontal flange 78 extending therearound and a skirt 80 extending downwardly from the outer edge of the horizontal flange. In this way, the lower edge of the skirt 80 rests on the upper edge of the lower portion of each casing 72. A pair of latches 82 enable each lid 76 to be removed in order to provide access to the interior.

Within each casing 72 is a battery 84, the two batteries 84 being connected together so as to provide a source of electric power for propelling the bicycle 10. Of course, the batteries 84 have their own casings, but it is of importance to recognize that any spillage or leakage of electrolyte from the batteries 84 will only go into the outer casings 72. In other words, the arrangement is virtually spill-proof owing to the presence of the casings 72, these casings acting as "saddle bags" at either side of the unit 40 for the batteries themselves. From FIGS. 4 and 6, it will be perceived that the center of gravity, while somewhat above the rear axle 24, nonetheless is quite low. Furthermore, the presence of a casing 72 plus a battery 84 at each side of the bicycle 10 further contributes to the balancing and the facile handling of the bicycle.

Figure 4:
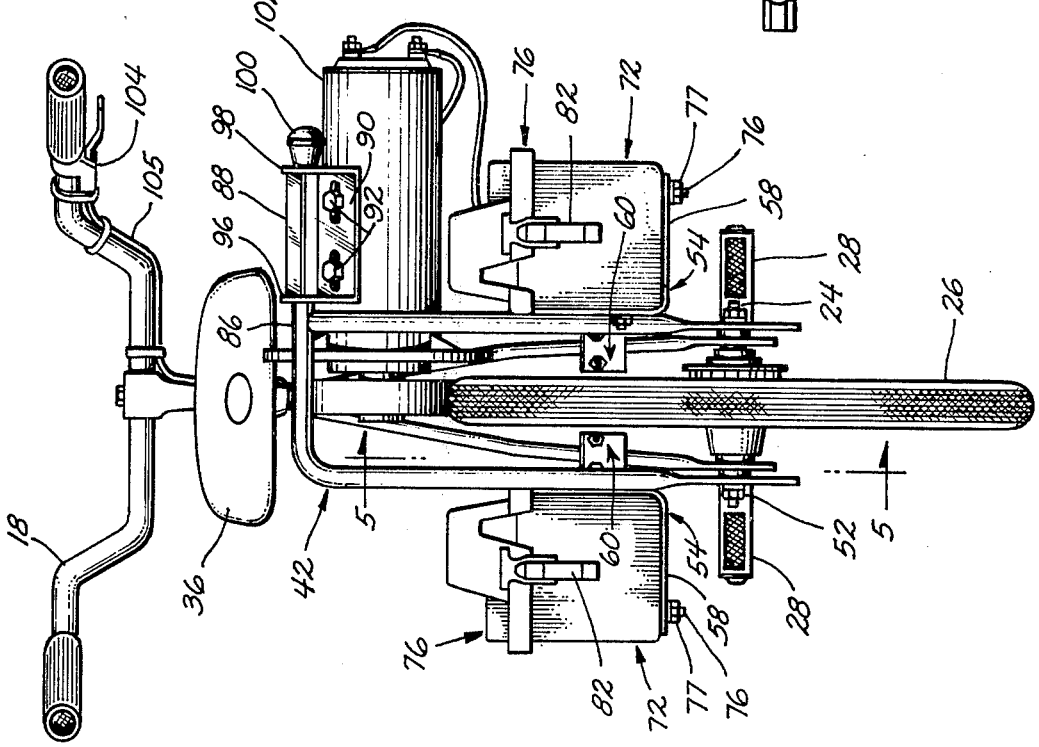
FIG. 4 is a rear elevational view.
Figure 6:
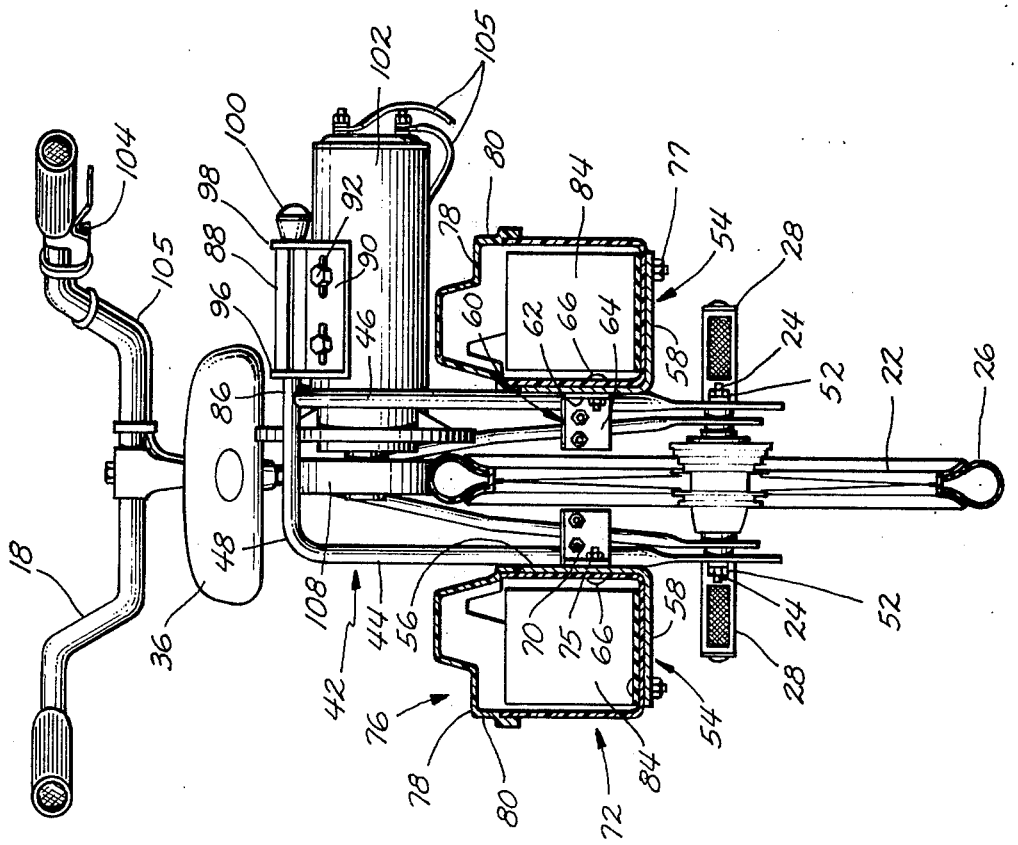
FIG. 6 is a sectional view taken in the direction of line 6—6 of FIGS. 1 and 2, the scale being that of FIG. 2 and illustrating in section the two casings of my unit which house the batteries.

As perhaps best viewed in FIGS. 3, 4 and 6, the connecting member 48 at the top or upper end of the frame 42 has an extension 86 integral therewith, the extension 86 extending laterally or horizontally so as to function as a shaft for a purpose now to be explained. In this regard, it will be observed that the extension or shaft 86 has a sleeve 88 pivotally encircling same, the sleeve 88 having a leaf or flange 90 provided with two mounting apertures for the accommodation of two bolts 92 for a purpose presently to be described. A pair of washers 96, 98 and a cotter pin (not visible) retain the sleeve 88 on the shaft 86. Preferably, a cap 100 is placed over the end of the shaft 86 containing the cotter pin, the cap 100 concealing the cotter pin in this instance.

It should now be understood that the shaft 86 provides a pivot axis for an electric drive motor 102 now to be referred to. In the achieving of this aim, the bolts 92 extend into tapped holes in the casing of the motor 102. At this time, it can be pointed out that the motor 102 found successful in actual use is a lightweight fractional horsepower, low RPM, permanent magnet, direct current motor, the permanent magnet feature eliminating motor field current losses. It can also be explained that the DC motor 102 that has been found successful is a 24 volt motor. Consequently, the batteries 84 that have already been referred to are connected so as to furnish a 24 volt supply. In this regard, with cells each furnishing two volts, two six cell batteries connected in series supply the 24 volts. Quite obviously, other voltages can be selected. Close inspection of FIG. 1 will show that an on-off switch 104 is mounted on the handlebars 18, appropriate conductors 105 connecting the switch 104 in circuit with the batteries 84 and motor 102.

Figure 7:
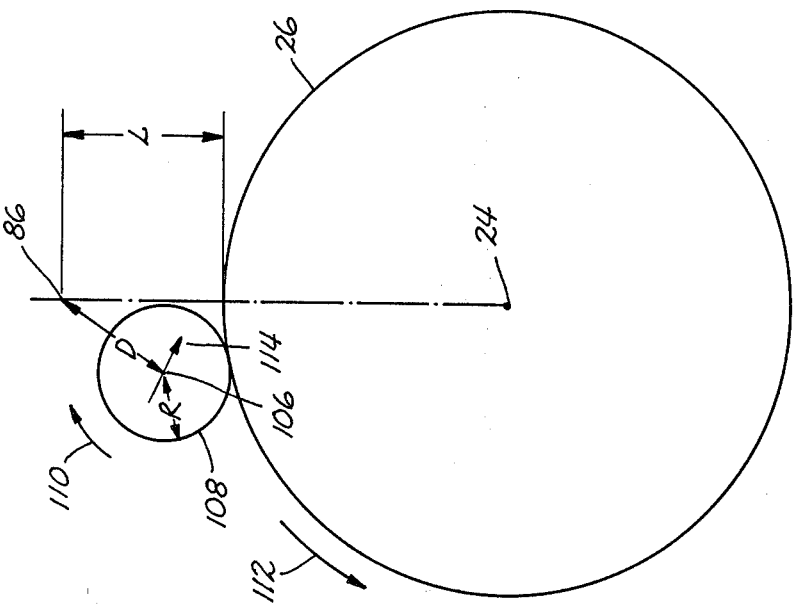
FIG. 7 is a diagrammatic view corresponding generally to FIG. 2 but illustrating the manner in which the frictional engagement of the drive wheel with the rear tire is enhanced in accordance with increased demands for power.

The motor 102 has a shaft 106 that has fixedly mounted thereon a drive wheel 108. It is of particular importance to recognize that the motor 102 pivots about an axis provided by the lateral extension or shaft 86 and that the axis of rotation for the motor shaft 106 is forwardly of a vertical line through the axle 24. The distance denoted D in FIG. 7 between the pivot axis provided by the shaft 86 and the axis of rotation provided by the motor shaft 106 on which the drive wheel 108 is carried is greater than the radius R of the drive wheel, yet less than the distance L between the shaft or pivot axis 86 and the uppermost peripheral segment of the tire 26 as measured in a radial direction. As perhaps best understood from FIG. 7, this creates a "notch" effect whereby the drive wheel 108, which rotates in a clockwise direction as viewed in FIGS. 1, 2, 5 or 7, there being an arrow 110 in FIG. 7 signifying the direction in which the drive wheel 108 rotates, causes the tire 26 and the rear wheel 22 on which it is mounted to rotate in a counterclockwise direction as indicated by the arrow 112.

Stated somewhat differently, if the load imposed on the motor 102 increases, the motor supplies a greater amount of torque to the drive wheel 108 which tends to cause the drive wheel to ride upwardly along the peripheral segment of the tire 26 in the direction of the substantially vertical frame. Physically, this cannot occur, for it would require that the shaft 86 move upwardly which it cannot do because it is a fixed part of the frame 42. Hence, there is a wedging action developed that tends to cause the shaft 106 on which the drive wheel 108 is mounted to move in the direction of the arrow labeled 114. Consequently, when a greater load is encountered, the mounting arrangement for the motor 102 results in the drive wheel 108 bearing more tightly against the tire 26 with the consequence that any tendency to slip is substantially decreased, that is virtually obviated. In other words, the frictional engagement of the drive wheel 108 against the tire 26 is enhanced, which is what is wanted.

Having presented the foregoing detailed information, it is believed that the manner in which my invention operates is readily understandable. However, in order to make certain that the benefits to be derived from a practicing of my invention are fully appreciated, a brief review will be helpful, it is believed.

In this regard, it will be understood that the user of my unit 40 first must mount the frame 42 on the axle 24. To do this the two vertical members 44, 46 are flexed apart to permit the ends of the axle 24 to enter the holes 50 at the lower ends of these vertical members when these members are allowed to move back toward each other. While holding the frame 42 vertical, the user then attaches the links or arms 60 to the forks 16, doing so by anchoring the flanges 64 thereto by means of the U-bolts 68 and loosening the bolts 66, if need be, so that the slotted configuration of the flanges 62 can be used to adjust the position of these flanges.

The attachment of the unit 40, more specifically its frame 42, is done usually without the batteries 84 in the casings 72. Assuming this to be the situation, then the batteries 84 are placed in the casings 72, the lids 76 being easily unlatched in order to do this. The terminal lugs of the batteries 84 are connected to the conductors 105 so that a circuit extends to the forwardly disposed on-off switch 104 when using two 12 volt batteries 84 and a 24 volt motor 102, the batteries obviously are connected in series.

Once installed, my unit 40 needs virtually no attention other than to maintain the batteries 84 in a charged condition. In use, the cyclist pedals, if he desires to do so, in the usual or normal fashion. If he desires to utilize the motor 102 to assist him, he simply closes the switch 104 and pedals to whatever degree he wishes in assisting the motor 102. Of course, if he desires that the motor 102 do all of the propelling, then he simply does no pedalling.

One nicety of the invention is that the mode of operating the bicycle 10 can be readily changed or varied without stopping the bicycle. More specifically, the user simply exerts whatever pedalling effort he feels is needed under the particular circumstances at hand. If he is going up a hill, particularly a rather steep one, he may wish to pedal some in order to assist the motor 102. All that he need do is make certain that the switch 104 is closed if he has been pedalling without any help from the motor.

It should be appreciated that in most instances, even where the switch 104 is open and the user is pedalling in the normal fashion, the drag stemming from the frictional engagement of the drive wheel 108 with the periphery of the tire 24 is indeed very minimal. Provision can be made quite readily, if desired, for swinging the motor 102 up about its shaft or pivot axis 86, a simple block (not illustrated) being all that is required.

Once again, the fact that any call for increased power, such as when going up an incline, causes the motor shaft 106 to move in the direction of the arrow 114 (FIG. 7) is in a direction to increase the frictional drive force of the drive wheel 108 against the tire 26. This occurs because the axis of rotation of the drive wheel is located forwardly of a vertical line through the axle 24 (and pivot axis 86), together with the fact that the distances between these two axes is greater than the radius R of the drive wheel 108, but less than the distance L between the tire 26 and the axis 86. Consequently, any tendency for the drive wheel 108 to slip with respect to the tire 26 is for all intents and purposes eliminated.

I claim:

1. An electric drive unit for bicycles comprising a frame for attachment to the bicycle to be propelled, an electric motor having a shaft and a drive wheel thereon, and means for mounting said motor on said frame for pivotal movement about a horizontal pivot axis so that said drive wheel frictionally engages a wheel tire at a location forwardly of a vertical line through the wheel axle when said frame is attached to the bicycle, the distance between said pivot axis and the axis of rotation of said drive wheel being greater than the radius of said drive wheel, and the distance between said pivot axis and the axis of rotation of said drive wheel being less than the distance between said pivot axis and the periphery of the wheel tire as measured in a radial direction.

2. An electric drive unit in accordance with claim 1 including a battery casing mounted on each side of said frame.

3. An electric drive unit in accordance with claim 2 including an L-shaped plate for each casing, each L-shaped plate having a vertical panel and a horizontal panel, said casings being supported on said horizontal panels.

4. An electric drive unit in accordance with claim 3 in which said vertical panels are secured to said frame.

5. An electric drive unit in accordance with claim 1 in which said frame is provided with holes at the lower end thereof for receiving the opposite ends of the wheel axle, said unit additionally including a pair of arms for connection to the fork of the bicycle.

6. An electric drive assembly in accordance with claim 5 including L-shaped plates, said arms being connected to said plates and said plates being welded to said frame, and a battery casing attached to each of said L-shaped plates.

7. An electric drive unit for bicycles comprising an inverted U-shaped frame including two straight leg portions and a connecting portion bridging the upper end of said leg portions and extending laterally beyond one of said leg portions to provide a shaft, respective means at the lower ends of said leg portions for connecting said lower ends to the axle of a bicycle wheel, a pair of L-shaped plates having horizontal and vertical panels, the vertical panel of each L-shaped plate being connected centrally to a leg portion so that said horizontal and vertical panels extend forwardly and rearwardly at right angles from the leg portions to which the vertical panels are connected, respective means adjacent the forward end of each of said vertical panels for connection to the fork of a bicycle so as to maintain said leg portions vertical when said frame straddles a bicycle wheel, an electric motor having a drive wheel engageable with the bicycle wheel tire, and hinge means extending forwardly from said shaft for pivotally supporting said motor and drive wheel forwardly of said shaft and at an elevation such that the rotation of said drive wheel in a direction to rotate the bicycle wheel in a direction to move the bicycle forwardly causes said motor to pivot downwardly about said shaft to increase the pressure of said drive wheel against the tire of the bicycle wheel, said respective means adjacent the forward ends of the vertical panels of said L-shaped plates preventing said frame and shaft from moving rearwardly due to said increased pressure of said drive wheel against the bicycle tire.

8. An electric drive unit in accordance with claim 7 including a pair of casings each having a bottom wall and upstanding side walls open at the top for the insertion therein of a battery, respective first means connecting the bottom wall of one casing to one of said horizontal panels and connecting the bottom wall of the other casing to the other of said horizontal panels, and respective second means connecting one side wall of said one casing to the vertical panel of said L-shaped plate to which the bottom wall of said one casing is connected and connecting one side wall of said other casing to the other of said vertical panels.

* * * * *